US012747304B2

(12) United States Patent
Zhao et al.

(10) Patent No.: US 12,747,304 B2
(45) Date of Patent: Sep. 29, 2026

(54) METHOD FOR PRODUCING C9 HYDROGENATED RESIN BY REUSING THERMALLY POLYMERIZED LIQUID RESIN

(71) Applicant: ZIBO LUHUA HONGJIN NEW MATERIAL GROUP CO., LTD., Shandong (CN)

(72) Inventors: Xinlai Zhao, Shandong (CN); Xinwu Wang, Shandong (CN); Ping Yang, Shandong (CN); Mingliang Wu, Shandong (CN); Yujiao Li, Shandong (CN); Zhihua Cui, Shandong (CN)

(73) Assignee: ZIBO LUHUA HONGJIN NEW MATERIAL GROUP CO., LTD., Shandong (CN)

( * ) Notice: Subject to any disclaimer, the term of this patent is extended or adjusted under 35 U.S.C. 154(b) by 81 days.

(21) Appl. No.: 18/576,546

(22) PCT Filed: Feb. 15, 2023

(86) PCT No.: PCT/CN2023/076047
§ 371 (c)(1),
(2) Date: Jan. 4, 2024

(87) PCT Pub. No.: WO2024/027131
PCT Pub. Date: Feb. 8, 2024

(65) Prior Publication Data
US 2025/0154292 A1 May 15, 2025

(30) Foreign Application Priority Data
Aug. 5, 2022 (CN) ........................ 202210934943.6

(51) Int. Cl.
*C08F 2/04* (2006.01)
*B01D 3/06* (2006.01)
(Continued)

(52) U.S. Cl.
CPC .................. *C08F 2/04* (2013.01); *B01D 3/06* (2013.01); *B01J 19/0013* (2013.01); *C08F 8/04* (2013.01); *C08F 240/00* (2013.01)

(58) Field of Classification Search
CPC ....... B01J 19/0013; C08F 240/00; C08F 2/04; C08F 8/04; B01D 3/06; Y02P 20/10
See application file for complete search history.

(56) References Cited

U.S. PATENT DOCUMENTS

2018/0186903 A1 7/2018 Lee et al.

FOREIGN PATENT DOCUMENTS

CN 101003602 A 7/2007
CN 102924659 A * 2/2013
(Continued)

*Primary Examiner* — Mark S Kaucher
(74) *Attorney, Agent, or Firm* — CANTOR COLBURN LLP

(57) ABSTRACT

Provided is a method for producing a C9 hydrogenated resin by reusing a thermally polymerized liquid resin. The method includes: preheating a polymerization reaction material by a feed heat exchanger using a polymerization liquid as a heat source, and then subjecting a resulting preheated polymerization reaction material to polymerization in a polymerization reactor group; transferring a mixed liquid of unpolymerized C9 and a liquid resin evaporated from a flash evaporation system (11) to a refining tower (9), and performing refining; subjecting a thermally polymerized resin obtained from a bottom of the flash evaporation system (11) to hydrogenation to synthesize a hydrogenated resin; and using a refined liquid resin obtained from the refining tower (9) as a vacuum mother liquor of the vacuum pump (18), and then returning the refined liquid resin to the polymerization reactor group, and making the refined liquid resin to participate in the polymerization.

10 Claims, 1 Drawing Sheet

(51) Int. Cl.

| | |
|---|---|
| ***B01J 19/00*** | (2006.01) |
| ***C08F 8/04*** | (2006.01) |
| ***C08F 240/00*** | (2006.01) |

(56) References Cited

FOREIGN PATENT DOCUMENTS

| | | | |
|---|---|---|---|
| CN | 114539475 | A | 5/2022 |
| CN | 115010859 | A | 9/2022 |

* cited by examiner

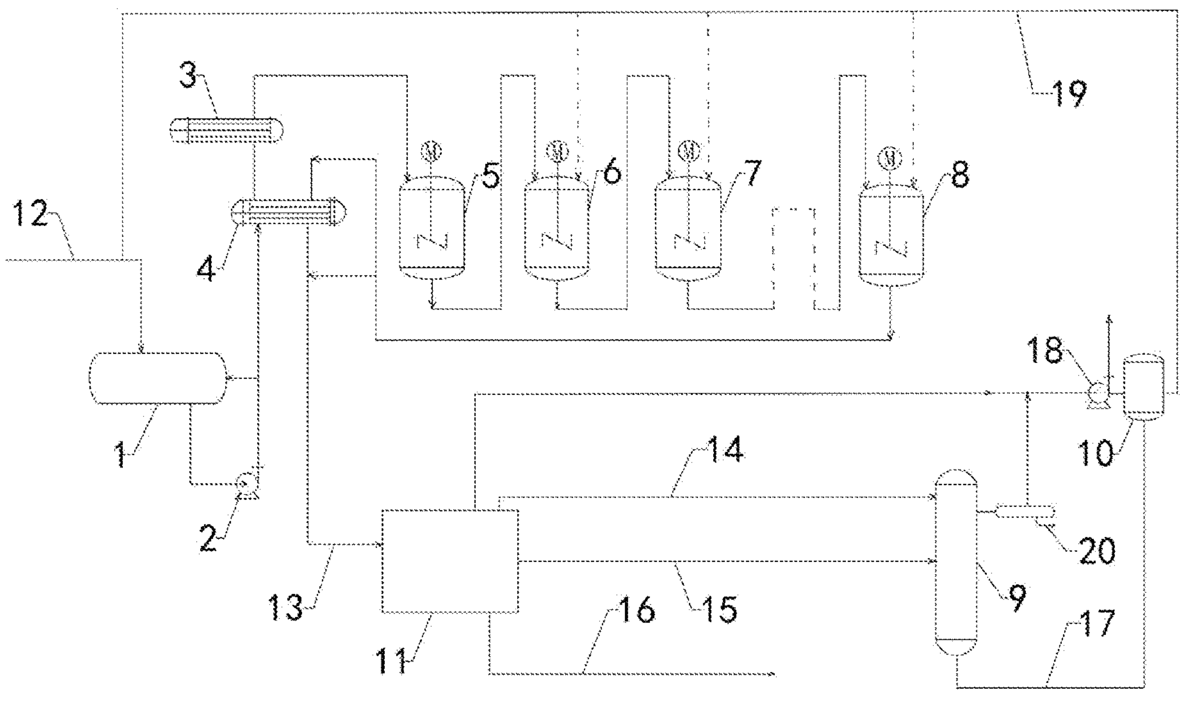
1
2
3
4
5
6
7
8
9
10
11
12
13
14
15
16
17
18
19
20

METHOD FOR PRODUCING C9 HYDROGENATED RESIN BY REUSING THERMALLY POLYMERIZED LIQUID RESIN

CROSS REFERENCE TO RELATED APPLICATIONS

This is a U.S. National Stage of Application No. PCT/CN2023/076047 filed on Feb. 15, 2023. Priority under 35 U.S.C. § 119(a) and 35 U.S.C. § 365 (b) is claimed from China Patent Application No. 202210934943.6, filed on Aug. 5, 2022, the disclosures of which are incorporated herein by reference in their entireties.

TECHNICAL FIELD

The present disclosure provides a method for producing a C9 hydrogenated resin by reusing a thermally polymerized liquid resin, and relates to the field of petroleum resins.

BACKGROUND

At present, polymerization processes of C9 petroleum resin mainly include free radical polymerization and cationic polymerization. Fractions with a cut distillation range of 140° C. to 200° C. are used as a polymerization raw material. The free radical polymerization refers to a reaction that occurs at a temperature of 160° C. to 170° C. for 10 h to 20 h by using a peroxide and a metal salt (such as cumene peroxide/sodium oleate) as initiators. The free radical polymerization could also be conducted by thermal initiation at a temperature of 230° C. to 250° C. directly without the initiators. An obtained polymerization liquid is distilled under reduced pressure to separate a solvent used during the reaction, and a remaining polymer is cooled to obtain a thermally polymerized petroleum resin. The thermally polymerized petroleum resin synthesized by thermal polymerization is then subjected to fixed-bed hydrogenation to produce a high-quality hydrogenated petroleum resin. The entire process is superior, with a simple process and no need for additional processing of raw material impurities.

However, the thermally polymerized petroleum resin produced by the thermal polymerization generally contains some oligomeric liquid resins. If the oligomeric liquid resins are directly introduced into the subsequent fixed-bed hydrogenation stage, more hydrogen may be consumed while a large amount of low-value hydrogenated liquid resin by-products would be produced, thereby reducing an overall profitability.

In view of this, it is still an urgent technical problem in the art that how to improve an overall conversion rate of active components in the thermal polymerization, reduce hydrogen consumption, and improve an overall value of the product.

SUMMARY

In order to overcome the shortcomings of the prior art, the present disclosure provides a method for producing a C9 hydrogenated resin by reusing a thermally polymerized liquid resin, so as to improve an overall conversion rate of active components.

The present disclosure provides a method for producing a C9 hydrogenated resin by reusing a thermally polymerized liquid resin, including the following steps:

1) preheating a polymerization reaction material by a feed heat exchanger, and then subjecting a resulting preheated polymerization reaction material to polymerization in a polymerization reactor group, where a heat source of the feed heat exchanger is a polymerization liquid obtained after the polymerization;
2) transferring the polymerization liquid that has released heat in the feed heat exchanger to a flash evaporation system, and performing flash evaporation, where a top of the flash evaporation system is connected to a vacuum pump through a first vacuum pipeline to provide a negative pressure for the flash evaporation system;
3) transferring unpolymerized C9 and a liquid resin that are evaporated from the flash evaporation system to a refining tower, and performing refining; and subjecting a thermally polymerized resin obtained from a bottom of the flash evaporation system to hydrogenation to synthesize a hydrogenated resin; and
4) using a refined liquid resin obtained from a bottom of the refining tower as a vacuum mother liquor of the vacuum pump and then returning the refined liquid resin to a feed pipeline in front of the feed heat exchanger group or the polymerization reactor group, and making the refined liquid resin to participate in the polymerization, where a top of the refining tower is connected to the vacuum pump through a second vacuum pipeline to provide a negative pressure for the refining tower.

In the present disclosure, the method addresses disadvantages such as waste of hydrogen and excessive hydrogenated liquid resin by-products. The liquid resin is recycled and then used to participate in the polymerization to achieve chain growth, thereby improving the overall conversion rate of active components and ameliorating the technical shortcomings. In the present disclosure, in the method for producing the C9 hydrogenated resin by reusing the thermally polymerized liquid resin, units used include a polymerization system, a flash evaporation removal system, a liquid resin distillation and recovery system, and a returning and participating thermal polymerization system. The method enables a comprehensive conversion rate of raw materials to be improved by recycling all thermally polymerized liquid resin and making it to participate in the thermal polymerization. The finally obtained hydrogenated resin has a product yield increased by 10% to 25%. Moreover, the method makes it possible to reduce the hydrogen consumption in the hydrogenation and an amount of low-value by-products generated, thereby improving economic benefits.

In some embodiments, in the method for producing the C9 hydrogenated resin by reusing the thermally polymerized liquid resin, in step 3), the unpolymerized C9 obtained from an upper part of the flash evaporation system is transferred to the top of the refining tower, and subjected to the refining; a mixed liquid of the unpolymerized C9 and the liquid resin that are obtained from a middle part of the flash evaporation system is transferred to a middle part of the refining tower, and subjected to the refining. By controlling temperature and pressure of the refining tower and a content ratio of the unpolymerized C9 to the liquid resin, a molecular weight of the polymerized resin could be adjusted.

In some embodiments, in the method for producing the C9 hydrogenated resin by reusing the thermally polymerized liquid resin, in step 3), a condenser is arranged on the second vacuum pipeline at the top of the refining tower, and the unpolymerized C9 as a by-product is obtained from a condensate outlet of the condenser and is fed into a tank.

In some embodiments, in the method for producing the C9 hydrogenated resin by reusing the thermally polymerized liquid resin, the vacuum pump is provided with a vacuum mother liquor tank, and the refined liquid resin obtained from the bottom of the refining tower is transferred to the vacuum mother liquor tank and used as the vacuum mother liquor of the vacuum pump.

In some embodiments, in the method for producing the C9 hydrogenated resin by reusing the thermally polymerized liquid resin, the polymerization reactor group includes a first polymerization reactor, a second polymerization reactor, a third polymerization reactor, . . . , and an n-th polymerization reactor that are connected in series. The refined liquid resin in step 4) is returned to any one of the polymerization reactors and participates in the polymerization. The staff could freely select the polymerization reactor to be returned based on the content of oligomeric liquid resins in a returned liquid resin. This could not only ensure a yield of the hydrogenated resin product, but also make the obtained thermally polymerized resin and the corresponding hydrogenated resin product have narrower molecular weight distribution.

In some embodiments, in the method for producing the C9 hydrogenated resin by reusing the thermally polymerized liquid resin, the first polymerization reactor, the second polymerization reactor, the third polymerization reactor, . . . , and the n-th polymerization reactor each are cooled by a low-temperature oil in an outer jacket and heated by a high-temperature oil in an inner coil.

In some embodiments, in the method for producing the C9 hydrogenated resin by reusing the thermally polymerized liquid resin, the feed heat exchanger group includes a second feed heat exchanger and a first feed heat exchanger. A heat source of the first feed heat exchanger is the polymerization liquid obtained after the polymerization, and a heat source of the second feed heat exchanger is an external steam. The polymerization reaction material is preheated by the first feed heat exchanger, and then preheated by the second feed heat exchanger.

The polymerization reaction material is preheated by the polymerization liquid and then preheated by the steam, thereby reducing steam consumption, improving a heat utilization rate of the system, accelerating the cooling of the polymerization liquid, and preventing the polymerization liquid fed into the flash evaporation system from bumping during desolvation due to excessive temperature.

In some embodiments, in the method for producing the C9 hydrogenated resin by reusing the thermally polymerized liquid resin, a heat source pipeline of the first feed heat exchanger is provided with a bypass pipeline. The bypass pipeline could adjust a proportion of the polymerization liquid that is cooled after passing through the feed heat exchanger, thereby adjusting a temperature of the polymerization liquid fed into the flash evaporation system, which could avoid increased energy consumption due to excessively low temperature and prevent bumping during desolvation due to excessively high temperature.

In some embodiments, in the method for producing the C9 hydrogenated resin by reusing the thermally polymerized liquid resin, the polymerization reaction material in step 1) and the refined liquid resin in step 4) are fed into a polymerization feed tank to obtain a mixed material. A bottom of the polymerization feed tank is connected to a polymerization feed pump, and a discharge port of the polymerization feed pump is connected to the feed heat exchanger.

In some embodiments, in the method for producing the C9 hydrogenated resin by reusing the thermally polymerized liquid resin, the discharge port of the polymerization feed pump is further connected to a circulation port of the polymerization feed tank through a tee, and the mixed material in the polymerization feed tank are circulated and blended by using the polymerization feed pump.

The materials in the polymerization feed tank are circulated and blended by using the polymerization feed pump, and a proportion of the materials fed into the feed heat exchanger could also be controlled through a circulation ratio to control a feeding rate. Moreover, the circulation and blending could prevent material deposition in the polymerization feed tank and avoid pipeline blockage.

Compared with the prior art, the method for producing a C9 hydrogenated resin by reusing a thermally polymerized liquid resin provided by the present disclosure has the following beneficial effects:

1. In the present disclosure, after the polymerization is completed, the designed flash evaporation and refining processes are conducted to recycle the liquid resin and return the same to participate in the polymerization, thereby achieving a dynamic balance between the production and reuse of the liquid resin. The liquid resin all participates in the reaction and is introduced into the thermally polymerized resin product, thereby increasing a reaction conversion rate by 10% to 25%, and preventing more low-molecular resins from participating in subsequent hydrogenation reactions, so as to reduce subsequent consumption of hydrogen and catalysts.
2. In the present disclosure, the liquid resin is refined. The liquid resin after separating most of the unpolymerized C9 could be introduced into the vacuum pump to replace the vacuum oil and serve as a vacuum mother liquor. The liquid resin could also absorb the unpolymerized C9 that escapes into the vacuum pipeline in the flash evaporation system and the refining tower while serving as the vacuum mother liquor. In this way, this part of unpolymerized C9 could be prevented from being released into the environment by the vacuum pump, thereby improving a utilization rate of raw materials while increasing a safety of the production environment. After that, the above raw materials are introduced into the polymerization system together and participate in the polymerization, which does not require additional vacuum oil and has desirable vacuum effects, thereby realizing self-circulation of the system.
3. An adding position of the recycled liquid resin could be freely adjusted between each polymerization reactor according to the content of the oligomeric liquid resin in the returned liquid resin, which could not only ensure a yield of the hydrogenated resin product freedom freely, but also achieve narrower molecular weight distribution of the obtained thermally polymerized resin and the corresponding hydrogenated resin product.
4. The polymerization reaction material is preheated by the polymerization liquid from the polymerization and then preheated by steam, which could reduce steam consumption, improve a heat utilization rate of the system, and accelerate the cooling of the polymerization liquid at the same time, thereby preventing the polymerization liquid fed into the flash evaporation system from bumping during desolvation due to an excessive temperature.
5. In the present disclosure, each of the polymerization reactors is cooled by a low-temperature oil of an outer jacket and heated by a high-temperature oil of an inner coil, which could cool down or heat up the polymerization reactor in a timely and effective manner, such that the temperature control is stable to ensure efficient polymerization.

6. In the present disclosure, the unpolymerized C9 could be directly extracted from the condenser. The temperature and pressure of the refining tower are controlled to adjust the proportion of the oligomeric liquid resin and the unpolymerized C9 in the recycled liquid resin. Moreover, the greater the amount of returned unpolymerized C9, the smaller the molecular weight of the obtained thermally polymerized resin, thereby achieving an adjustable molecular weight of the thermally polymerized resin. As a result, the molecular weight of the subsequent hydrogenated resin product could be adjusted.
7. In the present disclosure, the entire process could be operated continuously and stably.

BRIEF DESCRIPTION OF THE DRAWINGS

The technical solutions of the present disclosure will be described in further detail below with reference to the accompanying drawings and examples. However, it should be understood that these drawings are only designed for explanation purposes and do not limit the scope of the present disclosure. Furthermore, unless otherwise specified, the drawings are intended only to conceptually illustrate the structural configurations described herein and are not necessarily drawn to scale.

FIGURE shows a schematic flow chart of the method for producing a C9 hydrogenated resin by reusing a thermally polymerized liquid resin provided by the present disclosure.

In the FIGURE, 1 refers to a polymerization feed tank, 2 refers to a polymerization feed pump, 3 refers to a second feed heat exchanger, 4 refers to a first feed heat exchanger, 5 refers to a first polymerization reactor, 6 refers to a second polymerization reactor, 7 refers to a third polymerization reactor, 8 refers to an n-th polymerization reactor, 9 refers to a refining tower, 10 refers to a vacuum mother liquor tank, 11 refers to a flash evaporation system, 12 refers to a polymerization raw material pipeline, 13 refers to a polymerization liquid pipeline, 14 refers to an unpolymerized C9 pipeline, 15 refers to a mixed liquid pipeline of the unpolymerized C9 and the liquid resin, 16 refers to a resin pipeline, 17 refers to a refined liquid resin pipeline, 18 refers to a vacuum pump, 19 refers to a reused oligomeric liquid resin pipeline, and 20 refers to a by-product extraction line.

DETAILED DESCRIPTION OF THE EMBODIMENTS

It should be noted that the terminology used herein is for the purpose of describing particular embodiments only and is not intended to limit exemplary embodiments according to the present disclosure. As used herein, singular is also intended to include plural unless the context clearly points out singular or plural. Moreover, terms "include", "comprise" and "have" as well as their any variations are intended to cover non-exclusive inclusion, for example, a process, method, system, product or apparatus including a series of steps or units is not required to be limited by those explicitly listed steps or units, but could include other steps or units not explicitly listed or inherent to the process, method, product or apparatus.

It should be noted that the embodiments in the present disclosure and features in the embodiments could be combined with each other in a non-conflicting situation.

The present disclosure is further described below with reference to specific examples, of which Example 1 is the best example.

Example 1

A Schematic Flow Diagram was Shown in the FIGURE:

1) A polymerization reaction material from a polymerization raw material pipeline 12 was fed into a polymerization feed tank 1 to allow temporary storage. The polymerization feed tank 1 was connected to a polymerization feed pump 2, and a discharge port of the polymerization feed pump 2 was connected to a first feed heat exchanger 4 and a second feed heat exchanger 3 that were connected in series through a tee. The polymerization feed pump 2 pumped the polymerization reaction material to the feed heat exchanger while circulating, and the polymerization reaction material fed to the feed heat exchanger was at ambient temperature (about 30° C.). Where a heat source of the first feed heat exchanger 4 was a polymerization liquid obtained from the subsequent polymerization, and a heat source pipeline of the first feed heat exchanger 4 was further provided with a bypass pipeline. The polymerization liquid obtained from the polymerization was at 245° C. A ratio of the polymerization liquid fed into the feed heat exchanger 4 to the polymerization liquid passing through the bypass pipeline was 2.4:1, and a heat source of the second feed heat exchanger 3 was external steam.

The polymerization reaction material was preheated by the first feed heat exchanger 4, and then preheated by the second feed heat exchanger 3, and then fed into a first polymerization reactor 5, a second polymerization reactor 6, a third polymerization reactor 7, . . . a fifth polymerization reactor that were connected in series in sequence, and subjected to polymerization. Where the polymerization reactors were cooled by a low-temperature oil in an outer jacket and heated by a high-temperature oil in an inner coil, and the polymerization in each polymerization reactor was conducted at 240° C. to 250° C. and a pressure of 0.6 MPa to 0.7 MPa.

2) A polymerization liquid I after heat release through the feed heat exchanger 4 was mixed with a polymerization liquid II in the bypass pipeline to obtain a mixed polymerization liquid at 170° C., which was transferred to a flash evaporation system 11 through a polymerization liquid pipeline 13, and subjected to flash evaporation.
3) A top of the flash evaporation system 11 was connected to a vacuum pump 18 through a vacuum pipeline to maintain a negative pressure for the flash evaporation. Unpolymerized C9 obtained from the flash evaporation system 11 was transferred to a top of a refining tower 9 through a unpolymerized C9 pipeline 14, and then subjected to refining. A mixed liquid of the unpolymerized C9 and a liquid resin obtained from the flash evaporation system 11 was transferred to a middle part of the refining tower 9 through a mixed liquid pipeline 15 of the unpolymerized C9 and the liquid resin, and then subjected to refining. A thermally polymerized resin was obtained from a bottom resin pipeline 16 of the flash evaporation system 11, and the thermally polymerized resin was fed into a downstream hydrogenation process to produce a hydrogenated resin with an average molecular weight of 1,500.

4) An upper part of the refining tower 9 was connected to the vacuum pump 18 through a vacuum pipeline to maintain a negative pressure for the refining in the refining tower 9. A condenser was arranged on the vacuum pipeline, and a refrigerant of the condenser was room-temperature circulating water at about 30° C. A condensate outlet of the condenser was connected to a by-product extraction line 20, and the unpolymerized C9 in a gas phase was condensed and recovered as a by-product. A refined liquid resin was obtained from a bottom of the refining tower 9, and the refined liquid resin was passed through a refined liquid resin pipeline 17 to a vacuum mother liquor tank 10, and used as a vacuum mother liquor of the vacuum pump 18. Where the unpolymerized C9 in the refined liquid resin obtained from the bottom of the refining tower 9 has a content of 30.4%, and the unpolymerized C9 in the liquid resin that was used as the vacuum pump mother liquor after absorbing part of the unpolymerized C9 in the vacuum air has a content of 31.9%. The liquid resin was returned to the third polymerization reactor 7 through a reused oligomeric liquid resin pipeline 19, and participated in the polymerization.

Example 2

A Schematic Flow Diagram was Shown in the FIGURE:

1) A polymerization reaction material from a polymerization raw material pipeline 12 was fed into a polymerization feed tank 1 to allow temporary storage. The polymerization feed tank 1 was connected to a polymerization feed pump 2, and a discharge port of the polymerization feed pump 2 was connected to a first feed heat exchanger 4 and a second feed heat exchanger 3 that were connected in series through a tee. The polymerization feed pump 2 pumped the polymerization reaction material to the feed heat exchanger while circulating, and the polymerization reaction material fed to the feed heat exchanger was at ambient temperature (about 20° C.). Where a heat source of the first feed heat exchanger 4 was a polymerization liquid obtained from the subsequent polymerization, and a heat source pipeline of the first feed heat exchanger 4 was further provided with a bypass pipeline. The polymerization liquid obtained from completing the polymerization was at 250° C. A ratio of the polymerization liquid fed into the feed heat exchanger 4 to the polymerization liquid passing through the bypass pipeline was 1.5:1, and a heat source of the second feed heat exchanger 3 was external steam.

The polymerization reaction material was preheated by the first feed heat exchanger 4, and then preheated by the second feed heat exchanger 3, and then fed into a first polymerization reactor 5, a second polymerization reactor 6, a third polymerization reactor 7, and a fourth polymerization reactor that were connected in series in sequence, and subjected to polymerization. Where the polymerization reactors were cooled by a low-temperature oil in an outer jacket and heated by a high-temperature oil in an inner coil, and the polymerization in each polymerization reactor was conducted at 245° C. to 250° C. and a pressure of 0.6 MPa to 0.7 MPa.

2) A polymerization liquid I after heat release through the feed heat exchanger 4 was mixed with a polymerization liquid II in the bypass pipeline to obtain a mixed polymerization liquid at 180° C., which was transferred to a flash evaporation system 11 through a polymerization liquid pipeline 13, and subjected to flash evaporation.

3) A top of the flash evaporation system 11 was connected to a vacuum pump 18 through a vacuum pipeline to maintain a negative pressure for the flash evaporation. Unpolymerized C9 obtained from the flash evaporation system 11 was transferred to a top of a refining tower 9 through a unpolymerized C9 pipeline 14, and then subjected to refining. A mixed liquid of the unpolymerized C9 and a liquid resin obtained from the flash evaporation system 11 was transferred to a middle part of the refining tower 9 through a mixed liquid pipeline 15 of the unpolymerized C9 and the liquid resin, and then subjected to refining. A thermally polymerized resin was obtained from a bottom resin pipeline 16 of the flash evaporation system 11, and the thermally polymerized resin was fed into a downstream hydrogenation process to produce a hydrogenated resin with an average molecular weight of 1,600.

4) An upper part of the refining tower 9 was connected to the vacuum pump 18 through a vacuum pipeline to maintain a negative pressure for the refining in the refining tower 9. A condenser was arranged on the vacuum pipeline, and a refrigerant of the condenser was room-temperature circulating water at about 20° C. A condensate outlet of the condenser was connected to a by-product extraction line 20, and the unpolymerized C9 in a gas phase was condensed and recovered as a by-product. A refined liquid resin was obtained from a bottom of the refining tower 9, and the refined liquid resin was passed through a refined liquid resin pipeline 17 to a vacuum mother liquor tank 10, and used as a vacuum mother liquor of the vacuum pump 18. Where the unpolymerized C9 in the refined liquid resin obtained from the bottom of the refining tower 9 has a content of 23.6%, and the unpolymerized C9 in the liquid resin that was used as the vacuum pump mother liquor after absorbing part of the unpolymerized C9 in the vacuum air has a content of 24.3%. The liquid resin was returned to the fourth polymerization reactor through a reused oligomeric liquid resin pipeline 19, and participated in the polymerization.

Example 3

A Schematic Flow Diagram was Shown in the FIGURE:

1) A polymerization reaction material from a polymerization raw material pipeline 12 was fed into a polymerization feed tank 1 to allow temporary storage. The polymerization feed tank 1 was connected to a polymerization feed pump 2, and a discharge port of the polymerization feed pump 2 was connected to a first feed heat exchanger 4 and a second feed heat exchanger 3 that were connected in series through a tee. The polymerization feed pump 2 pumped the polymerization reaction material to the feed heat exchanger while circulating, and the polymerization reaction material fed to the feed heat exchanger was at ambient temperature (about 35° C.). Where a heat source of the first feed heat exchanger 4 was a polymerization liquid obtained from the subsequent polymerization, and a heat source pipeline of the first feed heat exchanger 4 was further provided with a bypass pipeline. The polymerization liquid obtained from the polymerization was at 235° C. A ratio of the polymerization liquid fed into the feed heat exchanger 4 to the polymerization liquid passing through the bypass pipeline was 3.2:1, and a heat source of the second feed heat exchanger 3 was external steam.

The polymerization reaction material was preheated by the first feed heat exchanger 4, and then preheated by the second feed heat exchanger 3, and then fed into a first polymerization reactor 5, a second polymerization reactor 6, a third polymerization reactor 7, . . . a sixth polymerization reactor that were connected in series in sequence, and subjected to polymerization. Where the polymerization reactors were cooled by a low-temperature oil in an outer jacket and heated by a high-temperature oil in an inner coil, and the polymerization in each polymerization reactor was conducted at 230° C. to 235° C. and a pressure of 0.6 MPa to 0.65 MPa.

2) A polymerization liquid I after heat release through the feed heat exchanger 4 was mixed with a polymerization liquid II in the bypass pipeline to obtain a mixed polymerization liquid at 164° C., which was transferred to a flash evaporation system 11 through a polymerization liquid pipeline 13, and subjected to flash evaporation.

3) A top of the flash evaporation system 11 was connected to a vacuum pump 18 through a vacuum pipeline to maintain a negative pressure for the flash evaporation. Unpolymerized C9 obtained from the flash evaporation system 11 was transferred to a top of a refining tower 9 through a unpolymerized C9 pipeline 14, and then subjected to refining. A mixed liquid of the unpolymerized C9 and a liquid resin obtained from the flash evaporation system 11 was transferred to a middle part of the refining tower 9 through a mixed liquid pipeline 15 of the unpolymerized C9 and the liquid resin, and then subjected to refining. A thermally polymerized resin was obtained from a bottom resin pipeline 16 of the flash evaporation system 11, and the thermally polymerized resin was fed into a downstream hydrogenation process to produce a hydrogenated resin with an average molecular weight of 1,340.

4) An upper part of the refining tower 9 was connected to the vacuum pump 18 through a vacuum pipeline to maintain a negative pressure for the refining in the refining tower 9. A condenser was arranged on the vacuum pipeline, and a refrigerant of the condenser was room-temperature circulating water at about 35° C. A condensate outlet of the condenser was connected to a by-product extraction line 20, and the unpolymerized C9 in a gas phase was condensed and recovered as a by-product. A refined liquid resin was obtained from a bottom of the refining tower 9, and the refined liquid resin was passed through a refined liquid resin pipeline 17 to a vacuum mother liquor tank 10, and used as a vacuum mother liquor of the vacuum pump 18. Where the unpolymerized C9 in the refined liquid resin obtained from the bottom of the refining tower 9 has a content of 33.5%, and the unpolymerized C9 in the liquid resin that was used as the vacuum pump mother liquor after absorbing part of the unpolymerized C9 in the vacuum air has a content of 35.2%. The liquid resin was returned to a liquid resin feed pipeline in front of the polymerization feed tank 1 through the reused oligomeric liquid resin pipeline 19.

Example 4

A Schematic Flow Diagram was Shown in the FIGURE:

1) A polymerization reaction material from a polymerization raw material pipeline 12 was fed into a polymerization feed tank 1 to allow temporary storage. The polymerization feed tank 1 was connected to a polymerization feed pump 2, and a discharge port of the polymerization feed pump 2 was connected to a first feed heat exchanger 4 and a second feed heat exchanger 3 that were connected in series through a tee. The polymerization feed pump 2 pumped the polymerization reaction material to the feed heat exchanger while circulating, and the polymerization reaction material fed to the feed heat exchanger was at ambient temperature (about 10° C.). Where a heat source of the first feed heat exchanger 4 was a polymerization liquid obtained from the subsequent polymerization, and a heat source pipeline of the first feed heat exchanger 4 was further provided with a bypass pipeline. The polymerization liquid obtained from the polymerization was at 220° C. A ratio of the polymerization liquid fed into the feed heat exchanger 4 to the polymerization liquid passing through the bypass pipeline was 5:1, and a heat source of the second feed heat exchanger 3 was external steam.

The polymerization reaction material was preheated by the first feed heat exchanger 4, and then preheated by the second feed heat exchanger 3, and then fed into a first polymerization reactor 5, a second polymerization reactor 6, a third polymerization reactor 7, . . . a fifth polymerization reactor that were connected in series in sequence, and subjected to polymerization. Where the polymerization reactors were cooled by a low-temperature oil in an outer jacket and heated by a high-temperature oil in an inner coil, and the polymerization in each polymerization reactor was conducted at 220° C. to 225° C. and a pressure of 0.85 MPa to 0.9 MPa.

2) A polymerization liquid I after heat release through the feed heat exchanger 4 was mixed with a polymerization liquid II in the bypass pipeline to obtain a mixed polymerization liquid at 150° C., which was transferred to a flash evaporation system 11 through a polymerization liquid pipeline 13, and subjected to flash evaporation.

3) A top of the flash evaporation system 11 was connected to a vacuum pump 18 through a vacuum pipeline to maintain a negative pressure for the flash evaporation. Unpolymerized C9 obtained from the flash evaporation system 11 was transferred to a top of a refining tower 9 through a unpolymerized C9 pipeline 14, and then subjected to refining. A mixed liquid of the unpolymerized C9 and a liquid resin obtained from the flash evaporation system 11 was transferred to a middle part of the refining tower 9 through a mixed liquid pipeline 15 of the unpolymerized C9 and the liquid resin, and then subjected to refining. A thermally polymerized resin was obtained from a bottom resin pipeline 16 of the flash evaporation system 11, and the thermally polymerized resin was fed into a downstream hydrogenation process to produce a hydrogenated resin with an average molecular weight of 1,800.

4) An upper part of the refining tower 9 was connected to the vacuum pump 18 through a vacuum pipeline to maintain a negative pressure for the refining in the refining tower 9. A condenser was arranged on the vacuum pipeline, and a refrigerant of the condenser was room-temperature circulating water at about 10° C. A condensate outlet of the condenser was connected to a by-product extraction line 20, and the unpolymerized C9 in a gas phase was condensed and recovered as a by-product. A refined liquid resin was obtained from a bottom of the refining tower 9, and the refined liquid resin was passed through a refined liquid resin pipeline 17 to a vacuum mother liquor tank 10, and used as a vacuum mother liquor of the vacuum pump 18. Where the unpolymerized C9 in the refined liquid resin obtained from the bottom of the refining tower 9 has a content of 20.1%, and the unpolymerized C9 in the liquid resin that was used as the vacuum pump mother liquor after absorbing part of the unpolymerized C9 in the vacuum air has a content of 20.4%. The liquid resin was returned to the third polymerization reactor 7 through a reused oligomeric liquid resin pipeline 19, and participated in the polymerization.

Example 5

A Schematic Flow Diagram was Shown in the FIGURE:

1) A polymerization reaction material from a polymerization raw material pipeline 12 was fed into a polymerization feed tank 1 to allow temporary storage. The polymerization feed tank 1 was connected to a polymerization feed pump 2, and a discharge port of the polymerization feed pump 2 was connected to a first feed heat exchanger 4 and a second feed heat exchanger 3 that were connected in series through a tee. The polymerization feed pump 2 pumped the polymerization reaction material to the feed heat exchanger while circulating, and the polymerization reaction material fed to the feed heat exchanger was at ambient temperature (about 37° C.). Where a heat source of the first feed heat exchanger 4 was a polymerization liquid obtained from the subsequent polymerization, and a heat source pipeline of the first feed heat exchanger 4 was further provided with a bypass pipeline. The polymerization liquid obtained from the polymerization was at 260° C. A ratio of the polymerization liquid fed into the feed heat exchanger 4 to the polymerization liquid passing through the bypass pipeline was 1:1, and a heat source of the second feed heat exchanger 3 was external steam.

The polymerization reaction material was preheated by the first feed heat exchanger 4, and then preheated by the second feed heat exchanger 3, and then fed into a first polymerization reactor 5, a second polymerization reactor 6, a third polymerization reactor 7, and a fourth polymerization reactor that were connected in series in sequence, and subjected to polymerization. Where the polymerization reactors were cooled by a low-temperature oil in an outer jacket and heated by a high-temperature oil in an inner coil, and the polymerization in each polymerization reactor was conducted at 255° C. to 260° C. and a pressure of 0.6 MPa to 0.65 MPa.

2) A polymerization liquid I after heat release through the feed heat exchanger 4 was mixed with a polymerization liquid II in the bypass pipeline to obtain a mixed polymerization liquid at 190° C., which was transferred to a flash evaporation system 11 through a polymerization liquid pipeline 13, and subjected to flash evaporation.

3) A top of the flash evaporation system 11 was connected to a vacuum pump 18 through a vacuum pipeline to maintain a negative pressure for the flash evaporation. Unpolymerized C9 obtained from the flash evaporation system 11 was transferred to a top of a refining tower 9 through a unpolymerized C9 pipeline 14, and then subjected to refining. A mixed liquid of the unpolymerized C9 and a liquid resin obtained from the flash evaporation system 11 was transferred to a middle part of the refining tower 9 through a mixed liquid pipeline 15 of the unpolymerized C9 and the liquid resin, and then subjected to refining. A thermally polymerized resin was obtained from a bottom resin pipeline 16 of the flash evaporation system 11, and the thermally polymerized resin was fed into a downstream hydrogenation process to produce a hydrogenated resin with an average molecular weight of 1,200.

4) An upper part of the refining tower 9 was connected to the vacuum pump 18 through a vacuum pipeline to maintain a negative pressure for the refining in the refining tower 9. A condenser was arranged on the vacuum pipeline, and a refrigerant of the condenser was room-temperature circulating water at about 37° C. A condensate outlet of the condenser was connected to a by-product extraction line 20, and the unpolymerized C9 condensed and recovered in a gas phase was condensed and recovered as a by-product. A refined liquid resin was obtained from a bottom of the refining tower 9, and the refined liquid resin was passed through a refined liquid resin pipeline 17 to a vacuum mother liquor tank 10, and used as a vacuum mother liquor of the vacuum pump 18. Where the unpolymerized C9 in the refined liquid resin obtained from the bottom of the refining tower 9 has a content of 37.8%, and the unpolymerized C9 in the liquid resin that was used as the vacuum pump mother liquor after absorbing part of the unpolymerized C9 in the vacuum air has a content of 39.5%. The liquid resin was returned to a liquid resin feed pipeline in front of the polymerization feed tank 1 through the reused oligomeric liquid resin pipeline 19.

The above described are merely preferred embodiments of the present disclosure, which are not intended to limit the present disclosure in other forms. Those skilled in the art may change or modify the technical content disclosed above into an equivalent. Any simple amendments or equivalent changes and modifications made to the above embodiments according to the technical essence of the present disclosure without departing from the content of the technical solution of the present disclosure should fall within the scope of the technical solution of the present disclosure.

What is claimed is:

1. A method for producing a C9 hydrogenated resin by reusing a thermally polymerized liquid resin, comprising:

1) preheating a polymerization reaction material by a feed heat exchanger, and then subjecting a resulting preheated polymerization reaction material to polymerization in a polymerization reactor group, wherein a heat source of the feed heat exchanger is a polymerization liquid obtained after the polymerization;

2) transferring the polymerization liquid that has released heat in the feed heat exchanger to a flash evaporation system (11), and performing flash evaporation, wherein a top of the flash evaporation system (11) is connected to a vacuum pump (18) through a first vacuum pipeline to provide a negative pressure for the flash evaporation system (11);

3) transferring unpolymerized C9 and a liquid resin that are evaporated from the flash evaporation system (11) to a refining tower (9), and performing refining; and subjecting a thermally polymerized resin obtained from a bottom of the flash evaporation system (11) to hydrogenation to synthesize a hydrogenated resin; and 4) using a refined liquid resin obtained from a bottom of the refining tower (9) as a vacuum mother liquor of the vacuum pump (18) and then returning the refined liquid resin to a feed pipeline in front of the feed heat exchanger group or the polymerization reactor group, and making the refined liquid resin to participate in the polymerization, wherein a top of the refining tower (9) is connected to the vacuum pump (18) through a second vacuum pipeline to provide a negative pressure for the refining tower (9).

2. The method for producing the C9 hydrogenated resin by reusing the thermally polymerized liquid resin according to claim 1, wherein in step 3), the unpolymerized C9 obtained from an upper part of the flash evaporation system (11) is transferred to the top of the refining tower (9), and subjected to the refining.

3. The method for producing the C9 hydrogenated resin by reusing the thermally polymerized liquid resin according to claim 1, wherein a mixed liquid of the unpolymerized C9 and the liquid resin that are obtained from a middle part of the flash evaporation system (11) is transferred to a middle part of the refining tower (9), and subjected to the refining.

4. The method for producing the C9 hydrogenated resin by reusing the thermally polymerized liquid resin according to claim 1, wherein in step 3), a condenser is arranged on the second vacuum pipeline at the top of the refining tower (9), and the unpolymerized C9 as a by-product is obtained from a condensate outlet of the condenser.

5. The method for producing the C9 hydrogenated resin by reusing the thermally polymerized liquid resin according to claim 1, wherein the vacuum pump (18) is provided with a vacuum mother liquor tank (10), and the refined liquid resin obtained from the bottom of the refining tower (9) is transferred to the vacuum mother liquor tank (10) and used as the vacuum mother liquor of the vacuum pump (18).

6. The method for producing the C9 hydrogenated resin by reusing the thermally polymerized liquid resin according to claim 1, wherein the polymerization reactor group comprises a first polymerization reactor (5), a second polymerization reactor (6), a third polymerization reactor (7), . . . , and an n-th polymerization reactor (8) that are connected in series; and the refined liquid resin in step 4) is returned to any one of the polymerization reactors and participates in the polymerization.

7. The method for producing the C9 hydrogenated resin by reusing the thermally polymerized liquid resin according to claim 6, wherein the first polymerization reactor (5), the second polymerization reactor (6), the third polymerization reactor (7), . . . , and the n-th polymerization reactor (8) each are cooled by a low-temperature oil in an outer jacket and heated by a high-temperature oil in an inner coil.

8. The method for producing the C9 hydrogenated resin by reusing the thermally polymerized liquid resin according to claim 1, wherein the feed heat exchanger group comprises a second feed heat exchanger (3) and a first feed heat exchanger (4); a heat source of the first feed heat exchanger (4) is the polymerization liquid obtained after the polymerization, and a heat source of the second feed heat exchanger (3) is an external steam; and the polymerization reaction material is preheated by the first feed heat exchanger (4), and then preheated by the second feed heat exchanger (3).

9. The method for producing the C9 hydrogenated resin by reusing the thermally polymerized liquid resin according to claim 8, wherein a heat source pipeline of the first feed heat exchanger (4) is provided with a bypass pipeline.

10. The method for producing the C9 hydrogenated resin by reusing the thermally polymerized liquid resin according to claim 1, wherein the polymerization reaction material in step 1) and the refined liquid resin in step 4) are fed into a polymerization feed tank (1) to obtain a mixed material, a bottom of the polymerization feed tank (1) is connected to a polymerization feed pump (2), and a discharge port of the polymerization feed pump (2) is connected to the feed heat exchanger; and the discharge port of the polymerization feed pump (2) is further connected to a circulation port of the polymerization feed tank (1) through a tee, and the mixed material in the polymerization feed tank (1) are circulated and blended by using the polymerization feed pump (2).

* * * * *